(12) United States Patent
Yamazaki et al.

(10) Patent No.: US 6,327,778 B2
(45) Date of Patent: *Dec. 11, 2001

(54) METHOD FOR MOUNTING A LINEAR SLIDING DEVICE

(75) Inventors: Mitsuru Yamazaki; Toyoshi Kazama, both of Ojiya (JP)

(73) Assignee: Nippon Bearing Co., Ltd., Nagata-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/158,825

(22) Filed: Sep. 23, 1998

(30) Foreign Application Priority Data

Oct. 29, 1997 (JP) .................................................... 9-297609

(51) Int. Cl.$^7$ .................................................... B21D 53/10
(52) U.S. Cl. .................................... 29/898.03; 29/898.07; 29/469; 384/43; 384/59
(58) Field of Search ........................... 29/898.07, 898.03, 29/466, 464, 468, 469; 384/45, 43, 49, 59

(56) References Cited

U.S. PATENT DOCUMENTS

| 4,844,624 | * | 7/1989 | Teramachi | 384/45 |
| 4,934,835 | * | 6/1990 | Albert | 384/43 |
| 4,939,946 | * | 7/1990 | Teramachi | 74/89.15 |
| 5,265,963 | * | 11/1993 | Kawaguchi | 384/43 |
| 5,484,210 | * | 1/1996 | Gallone | 384/49 |
| 5,640,768 | * | 6/1997 | Teramachi | 29/898.03 |
| 5,755,516 | * | 5/1998 | Teramachi et al. | 384/45 |

* cited by examiner

*Primary Examiner*—S. Thomas Hughes
*Assistant Examiner*—Marc W. Butler
(74) *Attorney, Agent, or Firm*—Sughrue Mion, PLLC (57) ABSTRACT

To provide a method for mounting an outer sleeve onto a housing at low cost and with high precision in a linear sliding apparatus. The linear sliding apparatus has a shaft, and the outer sleeve is fitted around the shaft and slidable in a linear manner relative to the shaft. The method includes the steps of: engaging an outer circumference of the outer sleeve with a stationary member; and fixing the stationary member to the housing by a fastening member, thereby mounting the outer sleeve on the housing.

12 Claims, 10 Drawing Sheets

METHOD FOR MOUNTING A LINEAR SLIDING DEVICE

BACKGROUND OF THE INVENTION

The present invention relates to a method for mounting a linear sliding device.

A conventional linear sliding device is composed of a shaft and an outer sleeve fitted around the shaft and sliding in a linear manner relative to the shaft. The outer sleeve is moved in the linear manner relative to the shaft by rolling balls in a ball endless loop formed in the interior of the outer sleeve.

In order to mount and fix the outer sleeve of such a linear sliding device onto a housing, conventionally, a flange portion is provided on an outer circumferential portion of the outer sleeve, and the outer sleeve is mounted and fixed onto the housing by using a mounting hole formed in the flange portion. Alternatively, a key groove is formed along an axial direction of the outer sleeve on the outer circumferential surface of the outer sleeve and a key groove is also formed on the housing. A key is disposed in both key grooves to thereby mount and fix the outer sleeve onto the housing.

However, in the former mounting and fixing method, since the flange portion is formed integrally with the outer sleeve, that is, since the outer sleeve and the flange portion are simultaneously formed by cutting predetermined material, it takes a very long time for the work and at the same time, a weight of the outer sleeve is increased corresponding to the flanged portion.

Also, in the latter mounting and fixing method, it is necessary to machine the key grooves with high precision. A cost for machining the key grooves is very high. Furthermore, it is necessary to effect a slotter work to the inner diameter portion of the housing. It is very difficult to effect the slotter work to increase the working cost. In particular, in the case where the outer diameter of the outer sleeve is small, it is very difficult to work a key groove in the outer sleeve and further difficult to effect the slotter work of the housing, further increasing a manufacture cost.

Also, in addition to the above-described two mounting methods, there is a method in which a hole passing up to a mounting hole into which the outer sleeve is inserted is provided and a bolt or the like is threadedly fitted into this hole to fasten and fix the outer sleeve disposed in the mounting hole. However, this method suffers from a problem that the outer sleeve is deformed because the outer circumferential surface of the outer sleeve is depressed by the bolt or the like.

SUMMARY OF THE INVENTION

In order to overcome the above-noted defects inherent in the prior art, an object of the present invention is to provide a method for mounting a linear sliding device, by which the mounting of the outer sleeve onto the housing is facilitated with high precision and in low cost.

In order to attain this and other objects, according to a first aspect of the present invention, there is provided a method for mounting on a housing an outer sleeve of a linear sliding apparatus having a shaft, the outer sleeve being fitted around the shaft and slidable in a linear manner relative to the shaft, comprising the steps of: engaging any desired position of an outer circumference of the outer sleeve with a stationary member in a convex and concave engagement; and fixing the stationary member to the housing by a fastening member, thereby mounting the outer sleeve on the housing.

Also, according to a second aspect of the present invention, there is provided a method for mounting on a housing a cylindrical outer sleeve of a linear sliding apparatus having a shaft, by inserting the outer sleeve into a mounting hole of the housing, the outer sleeve being fitted around the shaft and slidable in a linear manner relative to the shaft, comprising the steps of: inserting the outer sleeve into the mounting hole; inserting a stationary member in abutment with a recess of an outer circumference of the outer sleeve; and fixing the stationary member around the mounting hole to the housing by a suitable means, thereby mounting the outer sleeve onto the housing.

Also, according to a third aspect of the present invention, there is provided a method for mounting on a housing a cylindrical outer sleeve of a linear sliding apparatus having a shaft, by inserting the outer sleeve into a mounting hole of the housing, the outer sleeve being fitted around the shaft and slidable in a linear manner relative to the shaft, comprising the steps of: inserting the outer sleeve into the mounting hole; inserting a stationary plate with its edge portion being in abutment with an outer circumference of the outer sleeve and a recess having a predetermined length and formed in a direction perpendicular to an axial direction of the outer sleeve; and fixing the stationary member around the mounting hole to the housing by a suitable means, thereby mounting the outer sleeve onto the housing.

Also, according to a fourth aspect of the invention, in the second aspect of the invention, another recess is formed on the outer circumference of the outer sleeve to face with the first-mentioned recess, and the stationary members are inserted into the respective recesses.

Also, according to a fifth aspect of the invention, in the second aspect of the invention, another recess is formed on the outer circumference of the outer sleeve to face with the first-mentioned recess, and the stationary members are inserted into the respective recesses.

Also, according to a sixth aspect of the invention, in the third aspect of the invention, an edge portion to be inserted onto one of an inner surface of the recess and a recess of the stationary member is formed into a taper surface.

Also, according to a seventh aspect of the invention, in the fourth aspect of the invention, an edge portion to be inserted onto one of an inner surface of the recess and a recess of the stationary member is formed into a taper surface.

Also, according to an eighth aspect of the invention, in the fifth aspect of the invention, an edge portion to be inserted onto one of an inner surface of the recess and a recess of the stationary member is formed into a taper surface.

Also, according to a ninth aspect of the invention, in any one of the first through eighth aspects of the invention, a planar stationary plate formed into a substantially L-shape is used as the stationary member.

Also, according to a tenth aspect of the invention, in the ninth aspect of the invention, a recess groove is formed on a side surface of the housing for retaining the side surface of the stationary plate, the stationary plate is provided on the recess groove, and the stationary plate is fixed to the housing at the recess groove by the fastening member, thereby mounting the outer sleeve onto the housing.

Also, according to an eleventh aspect of the present invention, there is provided a method for mounting on a housing an outer sleeve of a linear sliding apparatus having a shaft, the outer sleeve being fitted around the shaft and slidable in a linear manner relative to the shaft, comprising the steps of: providing a plurality of mounting holes in the housing so that a plurality of outer sleeves may be inserted into the plurality mounting holes; inserting the plurality of outer sleeves into the plurality of mounting holes; fitting planar stationary members between the plurality of outer sleeves in abutment with recesses formed in a direction perpendicular to an axial direction of the outer sleeves; retaining the outer sleeves to the housing by the stationary members inserted on both sides of each outer sleeve; and mounting the stationary members onto the housing by a suitable means, thereby mounting and fixing the outer sleeves onto the housing.

Also, according to a twelfth aspect of the present invention, there is provided a method for mounting on a housing an outer sleeve of a linear sliding apparatus having a shaft, the outer sleeve being fitted around the shaft and slidable in a linear manner relative to the shaft, comprising the steps of: providing a plurality of mounting holes in the housing so that a plurality of outer sleeves may be inserted into the plurality mounting holes; inserting the plurality of outer sleeves into the plurality of mounting holes; fitting planar stationary members, each having a large width at one end and a small width at the other end, between the plurality of outer sleeves in abutment with recesses formed in a direction perpendicular to an axial direction of the outer sleeves; retaining the outer sleeves to the housing by the stationary members inserted on both sides of each outer sleeve; and mounting the stationary members onto the housing by a suitable means, thereby mounting and fixing the outer sleeves onto the housing.

By engaging any desired position of the outer circumference of the outer sleeve with the stationary member in the convex and concave engagement and fixing the stationary member to the housing by a fastening member, thereby mounting the outer sleeve on the housing, it is possible to easily mount and fix the outer sleeve to the housing through the stationary member, and to positively mount and fix the outer sleeve to the housing.

Accordingly, in comparison with the case where the flange portion provided in the outer sleeve or the key groove is utilized in the conventional manner, it is possible to perform the mounting work of the outer sleeve onto the housing with high precision and in low cost.

By inserting the outer sleeve into the mounting hole, inserting the stationary member in abutment with the recess of the outer circumference of the outer sleeve and fixing the stationary member around the mounting hole to the housing by the suitable means, thereby mounting the outer sleeve onto the housing, it is possible to readily fix the outer sleeve to the housing by inserting the stationary member into the recess and to positively mount and fix the outer sleeve to the housing.

By inserting the outer sleeve into the mounting hole, inserting the stationary plate with its edge portion being in abutment with an outer circumference of the outer sleeve and the recess having a predetermined length and formed in the direction perpendicular to the axial direction of the outer sleeve, and fixing the stationary member around the mounting hole to the housing by the suitable means, thereby mounting the outer sleeve onto the housing, it is possible to readily fix the outer sleeve to the housing by inserting the stationary member into the recess and to positively mount and fix the outer sleeve to the housing.

In particular, the formation of the recess having the predetermined length in the direction perpendicular to the axial direction of the outer sleeve is very easy in machining. This does not lead to the increase in manufacture cost.

Accordingly, in comparison with the case where the flange portion provided in the outer sleeve or the key groove is utilized in the conventional manner, it is possible to perform the mounting work of the outer sleeve onto the housing with ease and high precision and in low cost.

Also, if the edge portion to be fitted into the recess of the stationary member or the inner side surface of the recess is formed into the taper surface, it is possible to perform the engagement between the recess and the stationary member without any displacement.

Also, since the planar stationary plate formed into the substantially L-shape is used as the stationary member, the side edge of one surface of the planar stationary plate formed into the substantially L-shape may be retained in abutment with the recess, and the other surface formed integrally substantially at a right angle to the one surface of the stationary plate may be brought into contact with the side surface of the housing. The movement of the one surface of the substantially L-shape of the stationary plate may be limited by the recess of the outer sleeve when the fastening member is mounted. Also, the other surface is formed integrally substantially at a right angle to the one surface and is in abutment with the side surface of the housing 3. It is therefore possible to readily mount the fastening member. Also, the stationary plate may be mounted and fixed positively and in the stable condition onto the housing. Accordingly, it is possible to firmly fix and mount the outer sleeve onto the housing in a very stable manner.

Also, since the planar stationary plate formed into the substantially L-shape is used as the stationary member and the recess groove by which the side surface of the stationary plate may be retained at the side surface of the housing is provided, the side edge of one surface of the planar stationary member formed into the substantially L-shape may be retained in abutment with the recess of the outer sleeve, and the other surface formed integrally substantially at a right angle to the one surface of the stationary plate may be brought into contact with the recess groove provided on the side surface of the housing to retain the stationary plate. Since the outer sleeve is mounted onto the housing by fixing the stationary plate to the housing at the recess groove portion by the fastening member, the movement of the one surface of the substantially L-shape of the stationary plate may be limited by the recess groove when the fastening member is mounted. Also, the other surface is formed integrally with the one surface and is in abutment with the side surface of the housing 3. It is therefore possible to readily mount the fastening member. Also, the stationary plate may be mounted positively and in the stable condition onto the housing. Accordingly, it is possible to firmly fix and mount the outer sleeve onto the housing in a very stable manner.

Also, when the planar fastening members are fitted in between the plurality of outer sleeves, it is possible to very easily retain and abut the fastening members at the recesses formed in the direction perpendicular to the axial direction of the outer sleeves located on both sides of each fastening member. By fitting the fastening members on both sides of each outer sleeve and mounting and fixing the fastening members to the housing, it is possible to mount the outer sleeve onto the housing in a positive and easy manner. Furthermore, since each outer sleeve located on both sides of each fastening member may be simultaneously mounted on the single fastening member, it is possible to mount and fix the outer sleeve with the small number of the fastening members in comparison with the case the outer sleeve is mounted by using the separate fastening member from both sides of each outer sleeve when the outer sleeve is to be mounted and fixed. Also, the arrangement space for the fastening members may be saved. Accordingly, it is possible to provide the outer sleeves in the housing at a high density. By providing the outer sleeves on the housing at the high density, it is possible to move the housing in a stabler manner in a linear fashion.

Also, when the planar fastening members each having the large width at one end and the small width at the other end are fitted in between the plurality of outer sleeves, it is possible to very easily retain and abut the fastening members at the recesses formed in the direction perpendicular to the axial direction of the outer sleeves located on both sides of each fastening member. By fitting the fastening members on both sides of each outer sleeve and mounting and fixing the fastening members on both sides of each outer sleeve, it is possible to mount the outer sleeve onto the housing in a positive and easy manner. Furthermore, since each outer sleeve located on both sides of each fastening member may be simultaneously mounted on the single fastening member, it is possible to mount and fix the outer sleeve with the small number of the fastening members in comparison with the case the outer sleeve is mounted and fixed by using the separate fastening member from both sides of each outer sleeve when the outer sleeve is to be mounted and fixed. Also, the arrangement space for the fastening members may be saved. Accordingly, it is possible to provide the outer sleeves in the housing at a high density. By providing the outer sleeves on the housing at the high density, it is possible to move the housing in a stabler manner in a linear fashion.

DESCRIPTION OF THE PREFERRED EMBODIMENTS

A method for mounting a linear sliding device according to an embodiment of the present invention will now be described with reference to the accompanying drawings.

Figure 1:
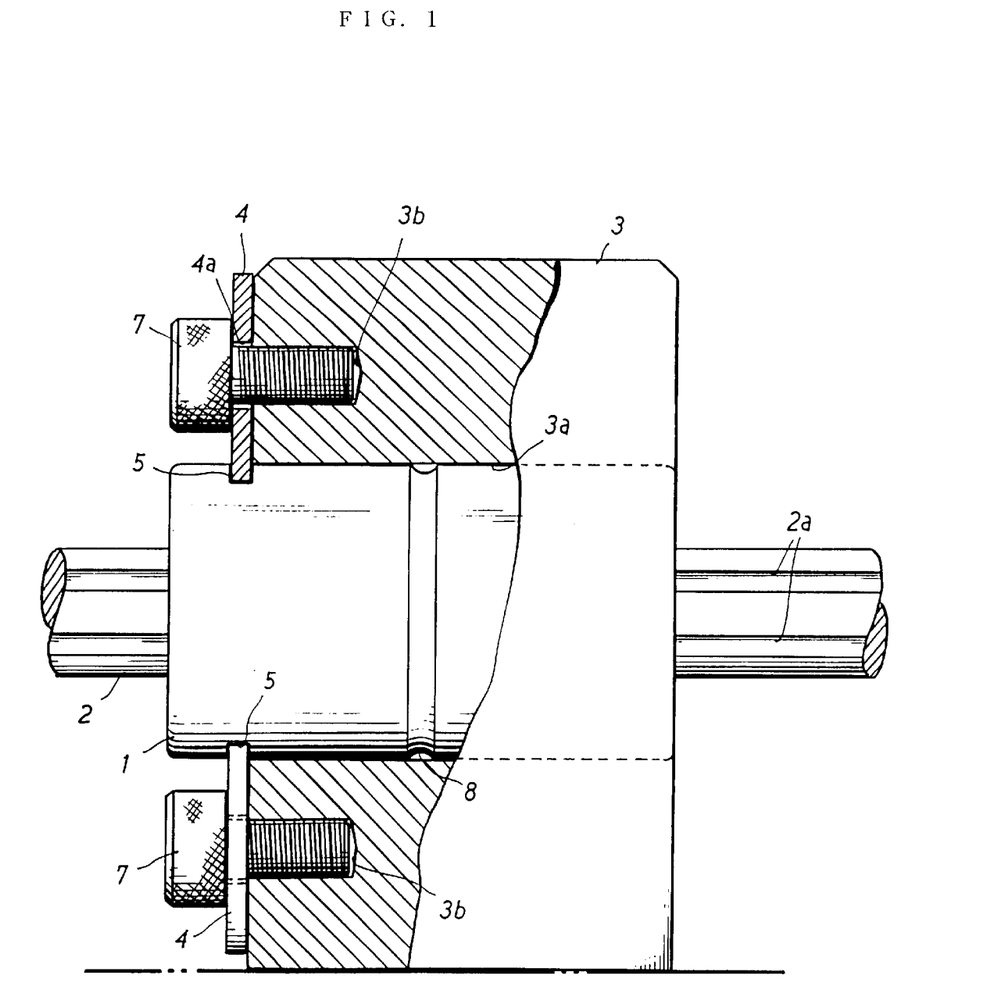
FIG. 1 is a cross-sectional frontal view showing a primary part in accordance with a first embodiment of the present invention.
Figure 2:
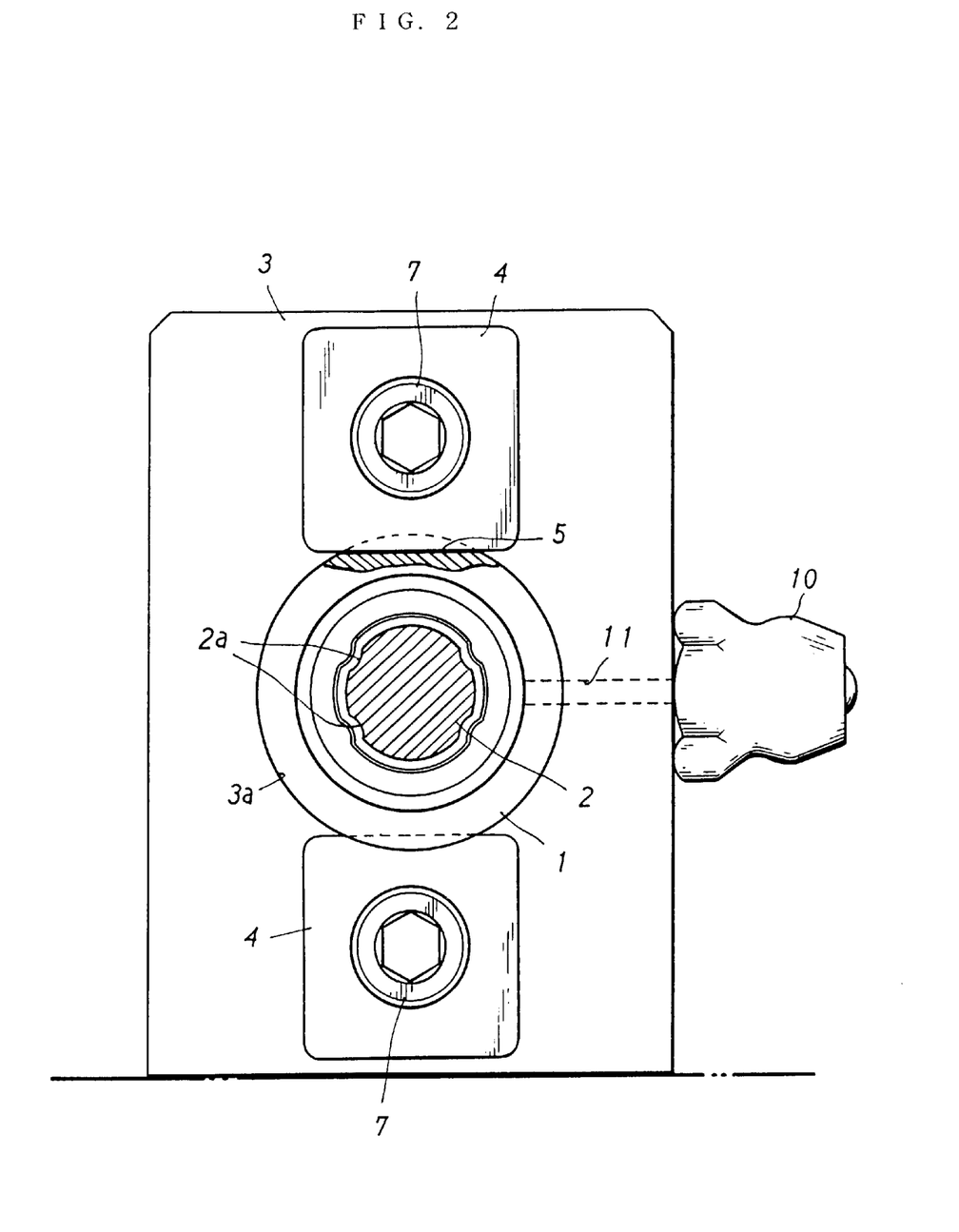
FIG. 2 is a fragmentary side elevational view showing the primary part shown in FIG. 1.

A first embodiment will now be described with reference to FIGS. 1 and 2.

In the first embodiment, a linear sliding device is generally composed of a shaft 2 and a cylindrical outer sleeve that may be slidingly moved relative to the shaft 2. A pair of linear recess grooves 5 having a predetermined length are formed in a direction perpendicular to an axis of the shaft in an outer circumference of the outer sleeve 1 of the linear sliding device symmetrically with respect to the centerline of the outer sleeve 1. A pair of planar stationary plates 4 (which also may be called stationary members) each having hole 4a are provided so as to be inserted into the recess grooves 5.

Figure 15:
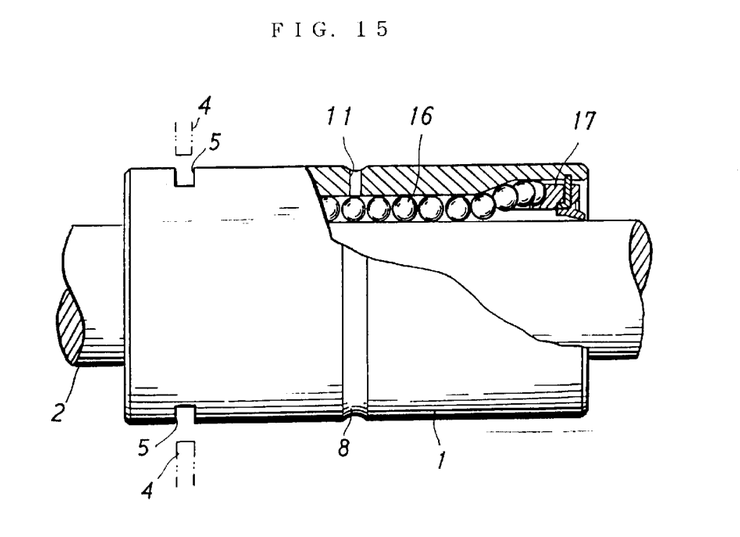
FIG. 15 is a fragmentary cross-sectional view showing a linear sliding apparatus.

FIG. 15 shows a structure of the outer sleeve 1 which takes a linear sliding movement relative to the shaft 2 while balls 16 are rolling through a ball endless recirculation path. Load ball grooves 2a are formed in the shaft 2 as shown in FIGS. 1 and 2. The outer sleeve 1 is rotated together with the shaft 2. However, needless to say, the present invention is not limited to this structure.

Incidentally, FIG. 15 shows the outer sleeve 1 in the case where the load ball grooves 2a are not formed in the shaft 2. Reference numeral 17 denotes a ball retainer.

The outer sleeve 1 is inserted into a mounting throughhole 3a formed in a housing 3 with the recess grooves 5 being exposed externally. An edge of each stationary plate 4 is in abutment or engagement with the associated recess groove 5 of the outer sleeve 1. A bolt as a fastening member 7 is inserted into a hole 4a of each stationary plate 4 so that the outer sleeve 1 is mounted on and fixed to the housing 3 in a threaded engagement manner with the bolt hole 3b formed in the housing 3.

Since the edge of each stationary plate 4 is fitted into the associated recess groove 5, the rotation of the stationary plate 4 is prevented. Also, since the pair of stationary plates 4 are provided to face each other, the outer sleeve 1 is positively mounted on and fixed to the mounting hole 3a of the housing 3.

In this case, since only two recess grooves 5 are machined to be formed in the outer sleeve 1, the machining work is very simple. Furthermore, since the mounting and fixing work may be performed only by fastening the bolts onto the outer sleeve 1, the workability is very excellent.

Reference numeral 8 denotes a grease groove for distributing the grease over the entire circumference of the outer sleeve 1. Reference numeral 10 denotes a grease nipple. Reference numeral 11 denotes a grease supply inlet.

Incidentally, the recess grooves 5 are provided on both right and left sides of the outer sleeve 1 to face each other. If the stationary plates 4 are inserted into the respective recess grooves 5 exposed externally from both sides of the housing 3, i.e., into four, in total, recess grooves 5 on the right and left and up and down, it is possible to firmly fix the outer sleeve 1 to the housing 3.

Figure 3:
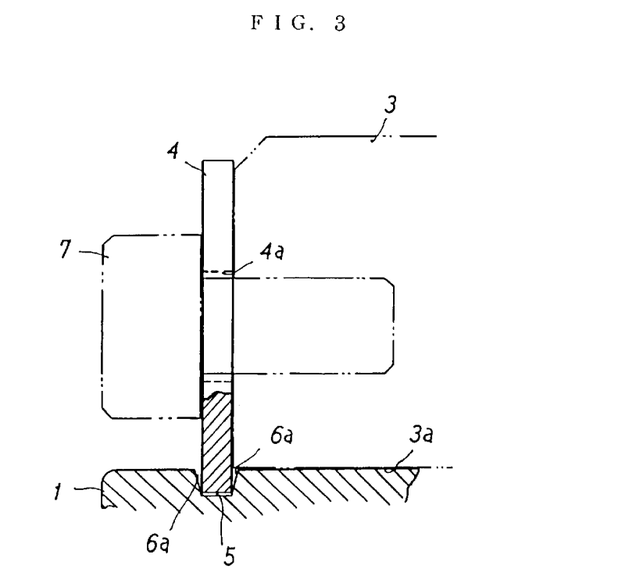
FIG. 3 is a partial cross-sectional view showing a primary part in accordance with a second embodiment of the present invention.

In accordance with a second embodiment shown in FIG. 3, both inner sides of the recess groove 5 provided in the outer sleeve 1 is formed into a tapered surface 6a. The tapered surface 6a is formed in the recess groove 5. Accordingly, if the stationary plate 4 is fitted into the recess groove 5, the engagement between the recess groove 5 and the stationary plate 4 may be performed without any displacement. It is possible to firmly fix the outer sleeve 1 onto the mounting hole 3a of the housing 3. The other structure is the same as that of the first embodiment.

Figure 4:
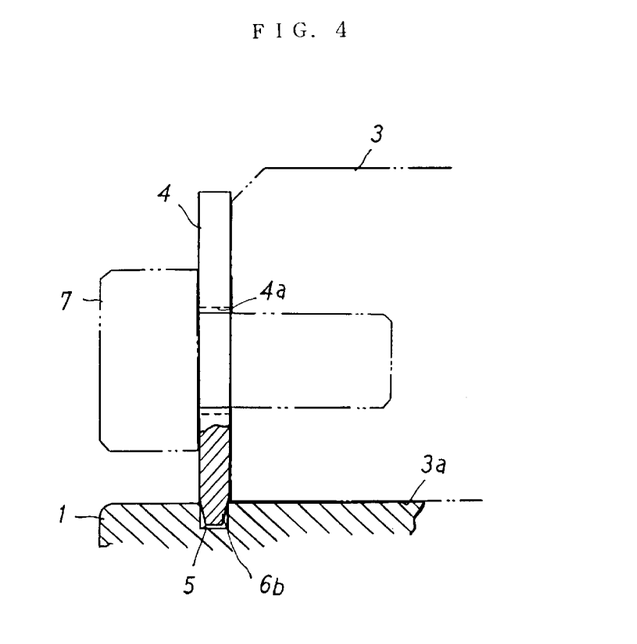
FIG. 4 is a partial cross-sectional view showing a primary part in accordance with a third embodiment of the present invention.

In a third embodiment shown in FIG. 4, inversely to the second embodiment, an edge portion to be inserted into the recess groove 5 of the stationary plate 4 is formed into a tapered surface 6b. In the same manner as in the second embodiment, the engagement between the stationary plate 4 and the recess groove 5 may be performed without fail.

Incidentally, if necessary, the tapered surface 6a is formed in the recess groove 5 as described above and the tapered surface 6b is formed in the edge portion to be fitted into the recess groove 5 of the stationary plate 4 whereby the stationary plate 4 provided with the tapered surface 6b is fitted into the recess groove 5 provided with the tapered surface 6a to thereby perform the engagement between the recess groove 5 and the stationary plate 4 more positively.

Figure 5:
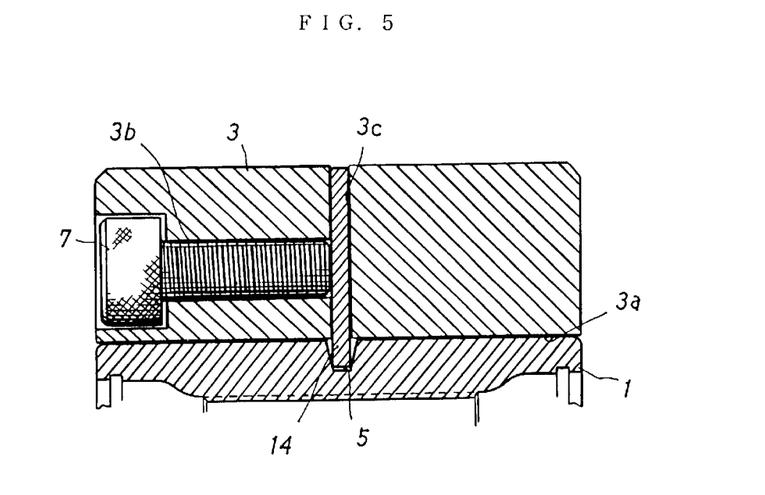
FIG. 5 is a partial cross-sectional view showing a primary part in accordance with a fourth embodiment of the present invention.

In a fourth embodiment shown in FIG. 5, a recess groove 5 for retaining the stationary plate 14 (which also maybe called a stationary member) is formed in a central portion, in the axial direction, of an outer circumference, whereas a stationary plate fitting groove 3c for inserting the stationary plate 14 into the recess groove 5 of the outer sleeve 1 is provided in the housing 3. The outer sleeve 1 is fitted into the mounting hole 3a of the housing 3. The stationary plate 14 is inserted from the stationary plate fitting groove 3c, and then inserted into the recess groove 5. A bolt as the fastening member 7 is threadedly engaged from one end of the housing 3. The stationary plate 14 is depressed to mount and fix the outer sleeve 1 onto the housing 3. The other structure is the same as that of the first and second embodiment.

Figure 6:
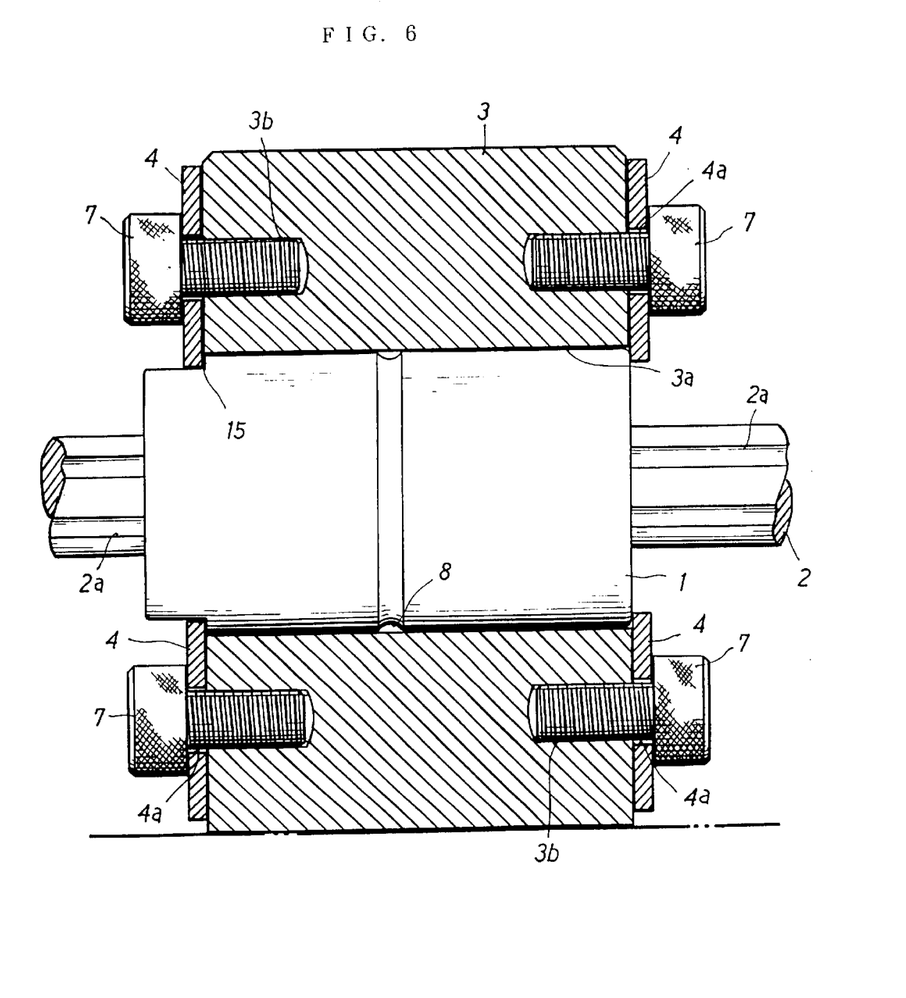
FIG. 6 is a partial cross-sectional frontal view showing a primary part in accordance with a fifth embodiment of the present invention.

In a fifth embodiment shown in FIG. 6, parts of the upper and lower portions on the left side of the outer sleeve 1 in FIG. 6 are cut away in an arcuate shape to form recesses 15. Then, the outer sleeve 1 is inserted into the mounting hole 3a of the housing 3. Also, the stationary plates 4 are brought into contact with the recesses 15. Also, the stationary plates 4 are mounted on the other end of the housing 3 to retain the other end of the outer sleeve 1 by the stationary plates 4.

Figure 7:
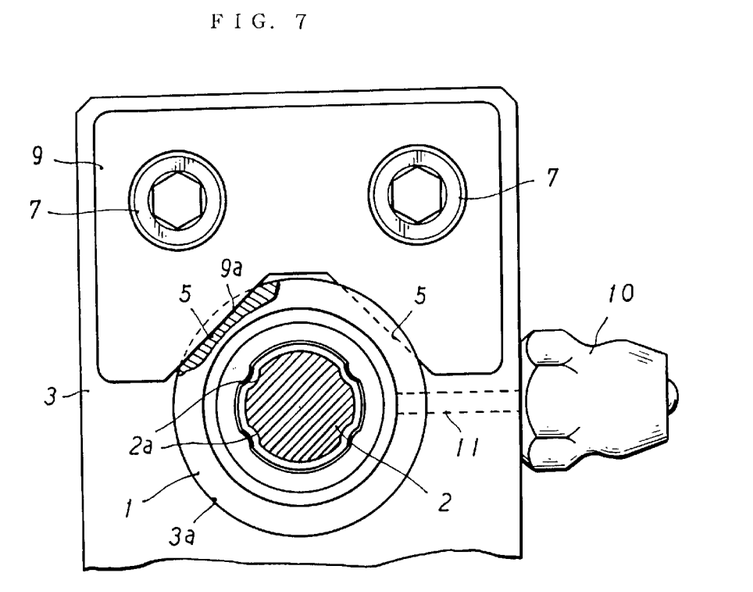
FIG. 7 is a partial cross-sectional side elevational view showing a primary part in accordance with a sixth embodiment of the present invention.

In a sixth embodiment shown in FIG. 7, a trapezoidal recess groove 5 is formed as the recess groove 5. On the other hand, a cutaway is formed in the planar stationary plate 9 (which also maybe called a stationary member) so that inner edges 9a of the planar stationary plate 9 are brought into contact with the trapezoidal recess 5.

In the sixth embodiment, since the trapezoidal recess groove 5 is thus formed and the stationary plates 9 provided with the cutaways to be contacted with the inner edges 9a of the recess grooves 5 are used, it is possible to clamp the outer sleeve 1 by the stationary plates 9 to thereby firmly mount and fix the outer sleeve 1 and the housing 3 to each other.

Figure 8:
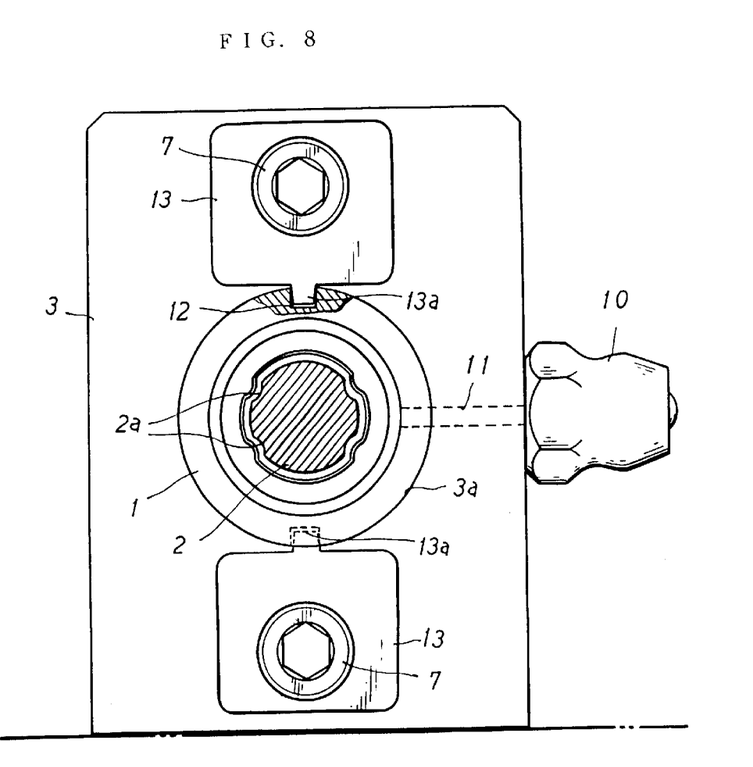
FIG. 8 is a partial cross-sectional side elevational view showing a primary part in accordance with a seventh embodiment of the present invention.

In a seventh embodiment shown in FIG. 8, a recess 12 formed into a circular hole in the outer circumference of the outer sleeve 1 is used as the recess portion 5. On the other hand, a planer stationary plate 13 (which also maybe called a stationary member) in which a projection 13a to be inserted into the recess 12 is formed is used.

The projection 13a is inserted into the recess 12 of the outer sleeve 1. The stationary plate 13 is threadedly mounted on the housing 3 by using a bolt used as the fastening member 7. The outer sleeve 1 is mounted and fixed onto the housing 3.

In the seventh embodiment, since the circular hole recess 12 that may be partially provided is used, in particular in the case where the diameter of the outer sleeve 1 is small, it is possible to reduce the amount of the material to be removed from the outer sleeve 1. It is therefore possible to prevent the degradation in mechanical strength of the outer sleeve 1.

Figure 9:
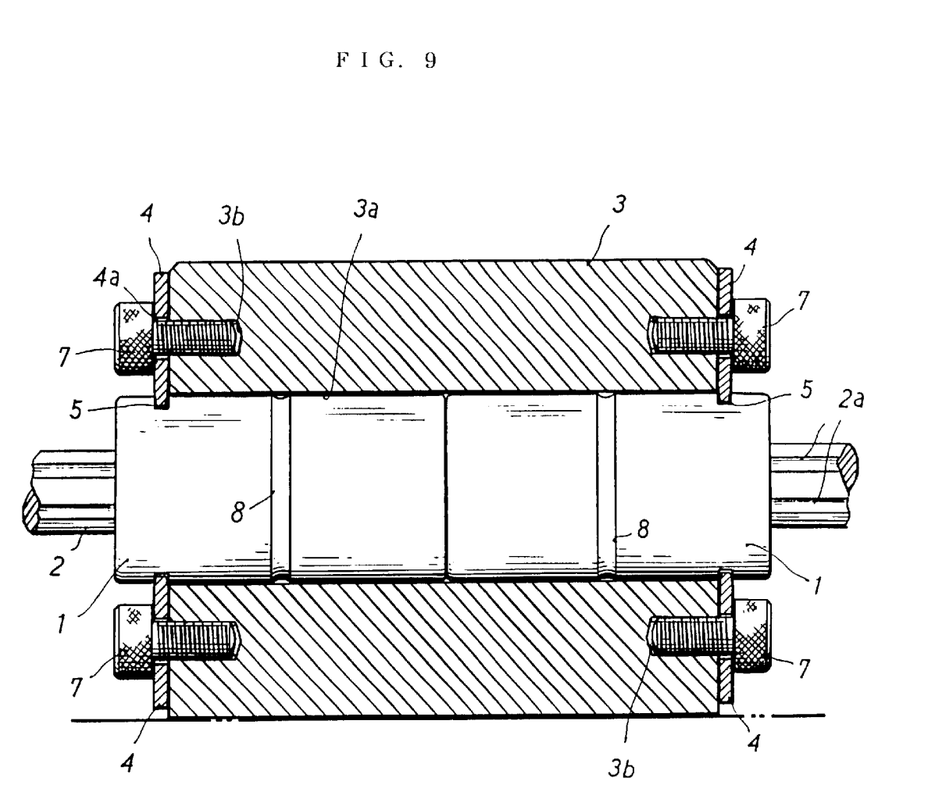
FIG. 9 is a partial cross-sectional frontal view showing a primary part in accordance with an eighth embodiment of the present invention.

In an eighth embodiment shown in FIG. 9, the outer sleeves 1 each having the same structure as that of the first embodiment are connected to each other and are fitted into the mounting hole 3a of the housing 3.

According to the eighth embodiment, it is possible to avoid the situation in which the key grooves of the two outer sleeves are not aligned at a predetermined position to hardly perform the mounting work of the outer sleeves in the case of the conventional mounting method by utilizing the key grooves.

Figure 10:
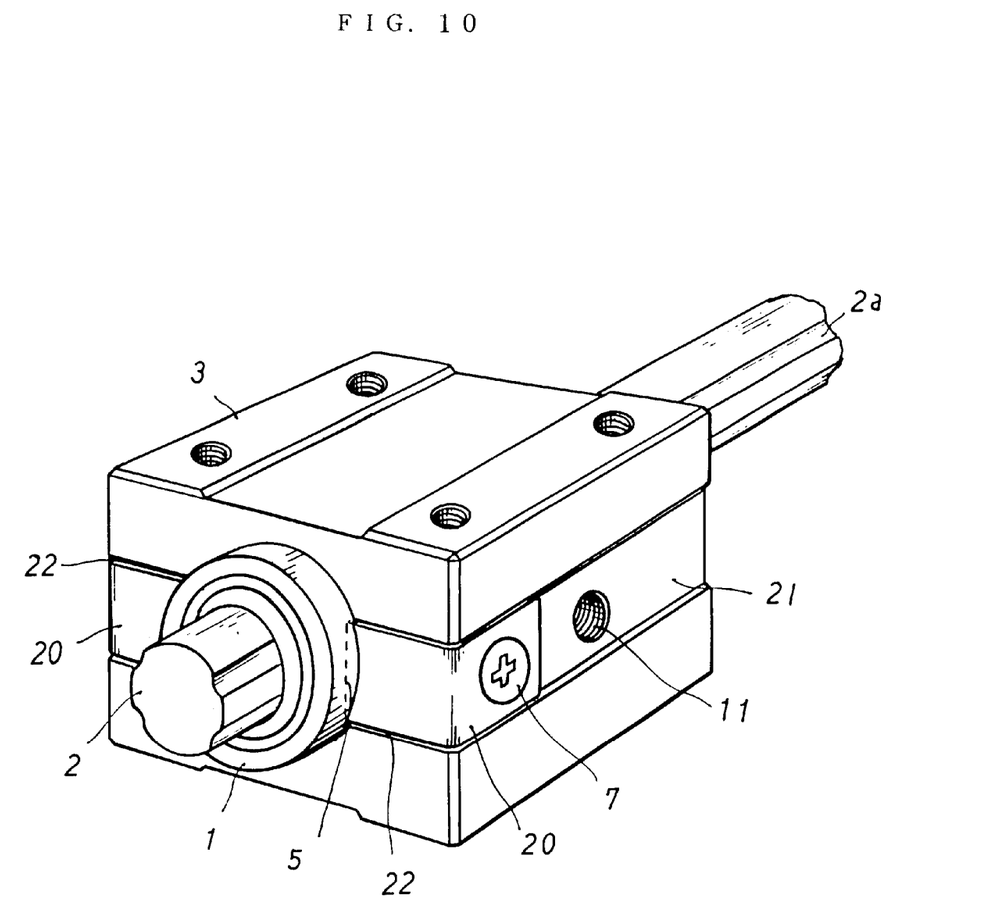
FIG. 10 is a perspective view showing a ninth embodiment of the present invention.

In a ninth embodiment shown in FIG. 10, stationary plates 20 (which also maybe called stationary member) each having a substantially L-shape are used as the stationary members 4. Recesses 22 are formed on both side surfaces at one end face of the housing 3 to be in contact with the recesses 5 of the outer circumference of the outer sleeve 1 so as to arrange the stationary plates 20. Furthermore, recess grooves 21 are suitably formed integrally with the recesses 22 on the side surface of the housing 3 so as to retain the side surfaces of the stationary plates 20.

The outer sleeve 1 is inserted into the mounting hole of the housing 3 in which the above-described recesses 22 and the recess grooves 21 are formed, so that the outer sleeve 1 is projected by a predetermined projection amount from one end face of the housing 3. The edge of each planar stationary plate 20 formed into a substantially L-shaped is contacted with and retained at the recess 5 formed in a direction perpendicular to the axial direction of the outer sleeve 1 on both sides of the outer circumference of the outer sleeve 1 projected from one end face of the housing 3. The plate surfaces integrally formed substantially perpendicular to the plate surfaces of the stationary plates 20, retained in abutment with the recesses 5 of the outer sleeve 1, are retained in abutment with the recess grooves 21 formed on both sides of the housing 3. The stationary plate 20 is mounted and fixed onto the housing 3 by using the screw members such as screws or bolts as the fastening members 7 for integrally fixing the stationary plates 20 to the housing 3 at the recess 21 portions of the housing 3.

As described above, the stationary plates 20 are mounted and fixed onto the housing 3 whereby the outer sleeve 1 may be mounted and fixed onto the housing 3.

By using the planar stationary plates 20 formed into the substantially L-shape as described above as the stationary members 4, it is possible to mount the stationary plates 20 onto the housing 3 in a stabler manner. The two L-shaped plate surfaces of the stationary plates 20 may be retained at the recesses 22 and the recess grooves 21 when the fastening members 7 are mounted. Therefore, the movement of the stationary plates 20 within the recesses 22 and the recess grooves 21 is limited so that the fastening members 7 may readily be mounted. The fastening plates 20 may be mounted and fixed onto the housing 3 under the condition that the stationary plates 20 are more positive and stable. Accordingly, the outer sleeve 1 may be firmly mounted and fixed onto the housing 3 in the very stable condition.

Incidentally, in the foregoing ninth embodiment, two stationary plates 20 are used on both side of one end portion of the housing 3. If necessary, it is possible to mount four stationary plates on both sides of both end portions of the housing 3 for mounting the outer sleeve 1 onto the housing. In this case, it is possible to firmly mount the outer sleeve 1 onto the housing 3 in a stabler manner.

Also, in some case, it is unnecessary to provide the recesses 22 or the recess grooves 21 on the side surfaces of both end portions of the housing 3. Furthermore, the same shape or combination of the first through eighth embodiments may be used for the shape or the combination of the recess 5 of the outer sleeve 1 or the plate surfaces of the stationary plates 20 for being retained in abutment with the recess 5 of the outer sleeve 1.

Figure 11:
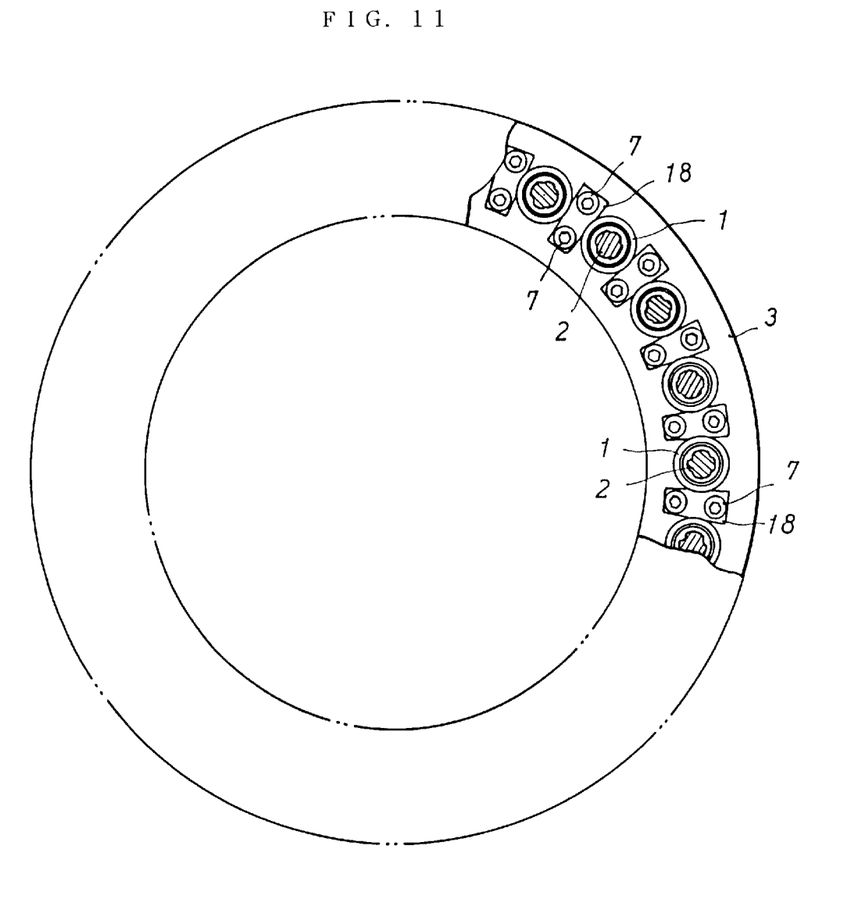
FIG. 11 is a partial side elevational view showing a tenth embodiment of the present invention.
Figure 12:
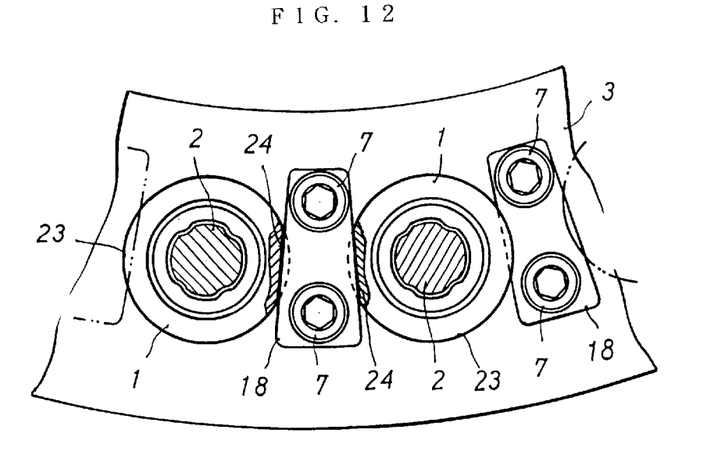
FIG. 12 is a partially enlarged side elevational view of the part shown in FIG. 11.

In a tenth embodiment shown in FIGS. 11 and 12, a plurality of mounting holes 23 are formed in a large cylindrical or sleeve-shaped housing 3 so that a plurality of outer sleeves 1 may be inserted into the mounting holes 23 so as to form a circle. The plurality of outer sleeves 1 are inserted into the plurality of mounting holes 23. Stationary plates 18 (which also maybe called stationary members) each having a large width at one end and a small width at the other end are inserted between the plurality of outer sleeves 1 inwardly from the outside of the housing 3 so as to be in abutment with recesses 24 suitably formed in a direction perpendicular to the axial direction of the outer sleeves 1. The outer sleeves 1 are retained at the housing 3 by the stationary plates 18 inserted on both sides of the outer sleeves 1. The outer sleeves 1 are mounted and fixed onto the housing 3 by mounting and fixing the stationary plates 18 onto the housing 3 by fastening members 7 provided suitably in the axial direction of the stationary plates 18.

When the planar stationary plates 18 each having the large width at one end and the small width at the other end are inserted between the plurality of outer sleeves 1 inwardly from the outside of the housing 3, it is possible to very easily abut and retain the stationary plates 18 at the recesses 24 suitably formed in the direction perpendicular to the axial direction of the outer sleeves 1 located on both sides of each stationary plate 18. It is possible to positively and easily mount and fix the outer sleeves 1 onto the housing 3 by inserting the stationary plates 18 on both sides of each outer sleeve 1 and mounting and fixing the plates 18 onto the housing 3.

Incidentally, in the above-described tenth embodiment, the housing 3 has been described as a large cylindrical or sleeve-like housing. However, the shape of the housing 3 is not limited to a cylindrical shape or sleeve-like shape. It is possible to cause the shape of the housing 3 to be any shape. Also, in the above-described tenth embodiment, the plurality of mounting holes 23 are provided so that the plurality of outer sleeves 1 may be inserted to form a circle. However, the provision of the plurality of mounting holes 23 is not limited to a circular shape. It is possible to provide the plurality of mounting holes 23 suitably in any desired location.

Figure 13:
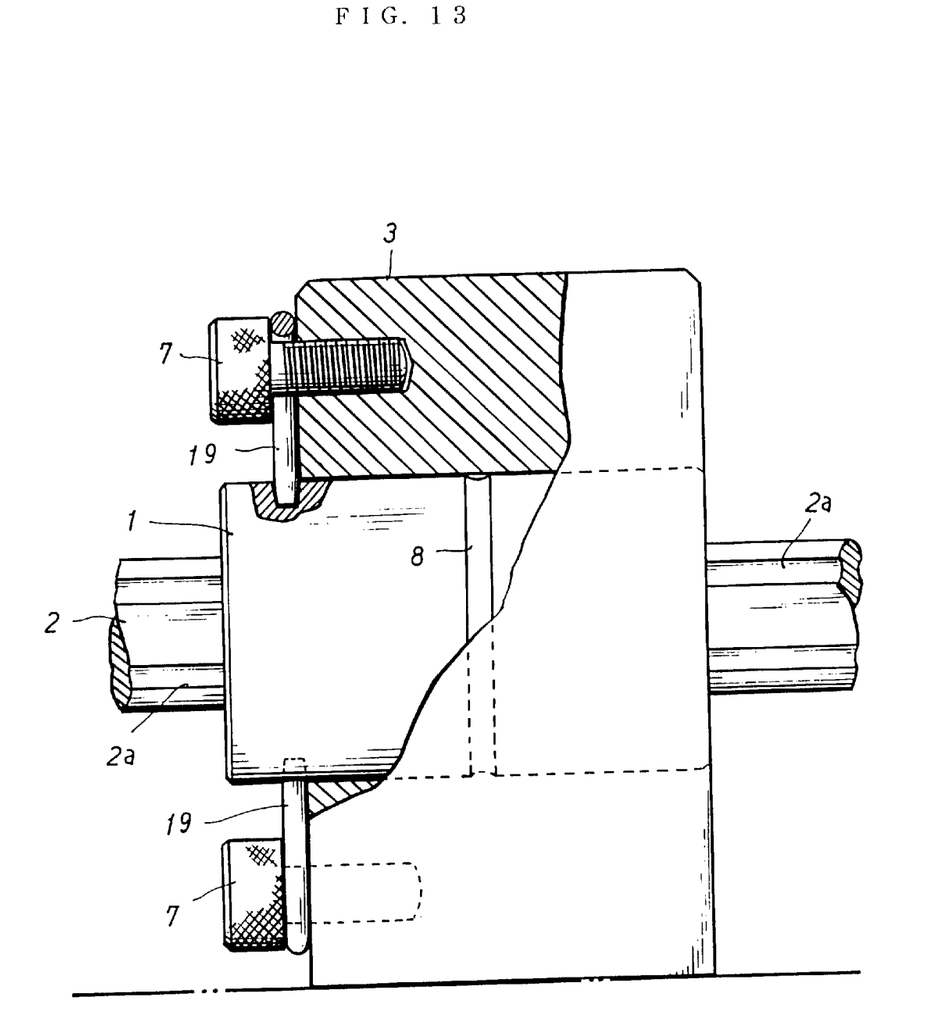
FIG. 13 is a cross-sectional frontal view showing a primary part in accordance with an eleventh embodiment of the present invention.
Figure 14:
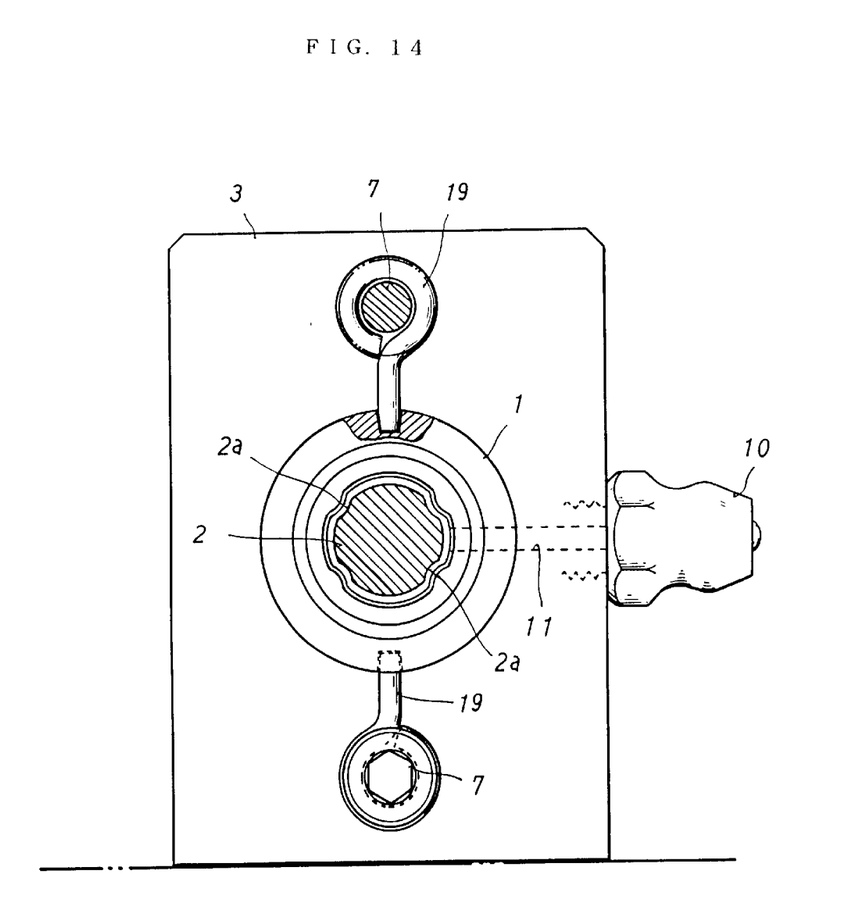
FIG. 14 is a fragmentary cross-sectional side elevational view showing the primary part shown in FIG. 13.

In an eleventh embodiment shown in FIGS. 13 and 14, instead of the planar stationary members 4 described in conjunction with the foregoing embodiments, rod-shaped (cylindrical) stationary members 19 are abutted and retained at the recess portions suitably provided on the outer circumference of the outer sleeve 1, and the stationary members 19 are suitably mounted and fixed onto the housing 3 by fastening members 7 to thereby mount and fix the outer sleeve 1 onto the housing 3. The shape of each stationary member 19 may be formed into a rod-shape as a whole or only a portion to be retained in abutment with the recess formed in the outer circumference of the outer sleeve 1 may take a suitable shape that is not planar but a cylindrical shape.

In the case where the housing 3 is mounted and fixed onto the outer circumference of the outer sleeve 1, in some cases, it is preferable to use the planar stationary members 4 and in other cases, it is preferable to adopt a cylindrical or any other shape other than the planar shape therefor, depending upon the shapes of the outer sleeve 1 and the housing 3 or the combination of the outer sleeve 1 and the housing 3. It is possible to select an optimum shape for the stationary member 4.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A method for mounting in a housing an outer sleeve of a linear sliding apparatus in a housing, said sliding apparatus having a shaft, the outer sleeve being fitted around the shaft and slidable in a linear manner relative to the shaft, comprising the steps of:

engaging an outer circumference of the outer sleeve with a stationary member, wherein the outer circumference is axially parallel to the enclosed shaft;

fixing the stationary member to the housing by a fastening member, thereby mounting the outer sleeve in the housing; and wherein the outer circumference of the outer sleeve abuts an inner surface of said housing.

2. A method for mounting in a housing a cylindrical outer sleeve of a linear sliding apparatus in a housing, said sliding apparatus having a shaft, by inserting the outer sleeve into a mounting hole of the housing, the outer sleeve being fitted around the shaft and slidable in a linear manner relative to the shaft, comprising the steps of:

inserting the outer sleeve into the mounting hole;

inserting a stationary member in abutment with a recess of an outer circumference of the outer sleeve;

fixing the stationary member around the mounting hole to the housing by fastening member, thereby mounting the outer sleeve in the housing; and wherein the outer circumference of the outer sleeve abuts an inner surface of said housing.

3. The method for mounting in a housing a cylindrical outer sleeve of a linear sliding apparatus in a housing according to claim 2, wherein another recess is formed on the outer circumference of the outer sleeve to face with the first-mentioned recess, and a pair of stationary members are inserted into the respective recesses.

4. The method for mounting in a housing a cylindrical outer sleeve of a linear sliding apparatus in a housing according to claim 3, wherein one of an edge portion on the stationary member to be inserted into an inner surface of the recess and a recess of the outer sleeve is formed into a taper surface.

5. A method for mounting in a housing a cylindrical outer sleeve of a linear sliding apparatus in a housing, said sliding apparatus having a shaft, by inserting the outer sleeve into a mounting hole of the housing, the outer sleeve being fitted around the shaft and slidable in a linear manner relative to the shaft, comprising the steps of:

inserting the outer sleeve into the mounting hole;

inserting a stationary member so that an edge portion abuts with an outer circumference of the outer sleeve and abuts with a recess having a predetermined length and formed in a direction perpendicular to an axial direction of the outer sleeve;

fixing the stationary member around the mounting hole to the housing by a fastening member, thereby mounting the outer sleeve in the housing; and wherein the outer circumference of the outer sleeve abuts an inner surface of said housing.

6. The method for mounting in a housing a cylindrical outer sleeve of a linear sliding apparatus in a housing according to claim 5, wherein another recess is formed on the outer circumference of the outer sleeve to face with the first-mentioned recess, and a pair of stationary members are inserted into the respective recesses.

7. The method for mounting in a housing a cylindrical outer sleeve of a linear sliding apparatus in a housing according to claim 5, wherein one of an edge portion on the stationary member to be inserted into an inner surface of the recess and a recess of the outer sleeve is formed into a taper surface.

8. The method for mounting in a housing a cylindrical outer sleeve of a linear sliding apparatus in a housing according to claim 6, wherein one of an edge portion on the stationary member to be inserted into an inner surface of the recess and a recess of the outer sleeve is formed into a taper surface.

9. The method for mounting in a housing an outer sleeve of a linear sliding apparatus in a housing according to claims 1 to 8, wherein a planar stationary plate formed into a substantially L-shape is used as the stationary member.

10. The method for mounting in a housing an outer sleeve of a linear sliding apparatus in a housing according to claim 9, wherein a recess groove is formed on a side surface of the housing for retaining the side surface of the stationary member, the stationary member is provided on the recess groove, and the stationary member is fixed to the housing at the recess groove by the fastening member, thereby mounting the outer sleeve onto the housing.

11. A method for mounting in a housing an outer sleeve of a linear sliding apparatus in a housing, said sliding apparatus having a shaft, the outer sleeve being fitted around the shaft and slidable in a linear manner relative to the shaft, comprising the steps of:

providing a plurality of mounting holes in the housing so that a plurality of outer sleeves may be inserted into the plurality of mounting holes;

inserting the plurality of outer sleeves into the plurality of mounting holes;

fitting planar stationary members between the plurality of outer sleeves and in abutment with recesses formed in a direction perpendicular to an axial direction of the outer sleeves;

retaining the outer sleeves to the housing by the stationary members inserted on both sides of each outer sleeve;

mounting the stationary members onto the housing by a fastening member, thereby mounting and fixing the outer sleeves in the housing; and wherein the outer circumference of the outer sleeve abuts an inner surface of said housing.

12. A method for mounting in a housing an outer sleeve of a linear sliding apparatus in a housing, said sliding apparatus having a shaft, the outer sleeve being fitted around the shaft and slidable in a linear manner relative to the shaft, comprising the steps of:

providing a plurality of mounting holes in the housing so that a plurality of outer sleeves may be inserted into the plurality mounting holes;

inserting the plurality of outer sleeves into the plurality of mounting holes;

fitting planar stationary members, each having a large width at one end and a small width at the other end, between the plurality of outer sleeves and in abutment with recesses formed in a direction perpendicular to an axial direction of the outer sleeves;

retaining the outer sleeves to the housing by the stationary members inserted on both sides of each outer sleeve;

mounting the stationary members onto the housing by a fastening member, thereby mounting and fixing the outer sleeves in the housing; and wherein the outer circumference of the outer sleeve abuts an inner surface of said housing.

\* \* \* \* \*